Oct. 31, 1933.                H. A. WADMAN                1,933,527
               ELECTRICALLY HEATED TANK FOR GLASS
                         Filed May 3, 1932
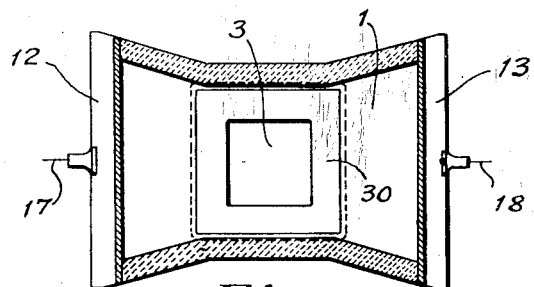
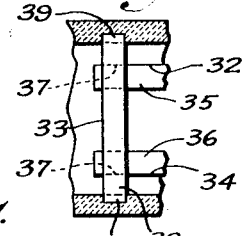
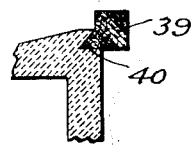
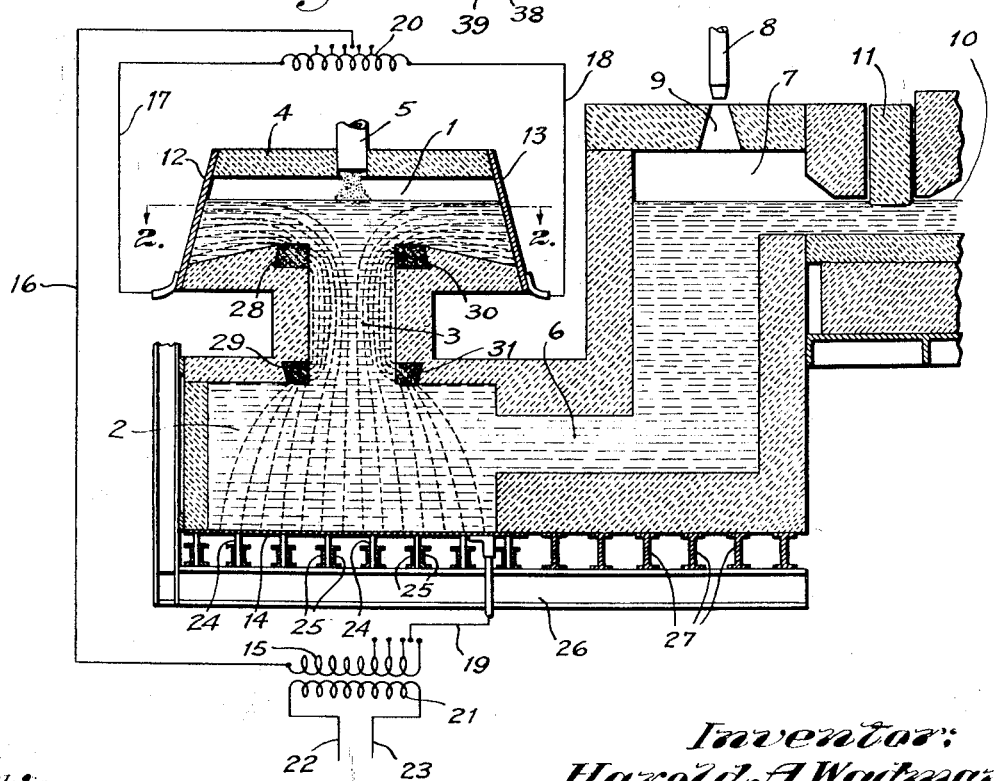
Inventor:
Harold A. Wadman
by Brown + Parker
Attorneys
Witness:
W. B. Thayer Patented Oct. 31, 1933

1,933,527

UNITED STATES PATENT OFFICE 1,933,527

ELECTRICALLY HEATED TANK FOR GLASS

Harold A. Wadman, West Hartford, Conn., assignor to Hartford-Empire Company, Hartford, Conn., a corporation of Delaware Application May 3, 1932. Serial No. 608,965

12 Claims. (Cl. 13—6)

This invention relates to glass making apparatus and particularly to devices for containing molten glass and/or melting glass batch to form molten glass, of the type in which the temperature of the glass is controlled, to some extent at least, by passing an electric current therethrough, the glass being used as the resistor.

In devices of this character in which the current is caused to pass through a path at an angle or around a corner, excessive wear has been experienced at the corners about which the current is forced to pass, this wear being due probably in part to the mechanical wiping action of the hot glass in moving around these corners or reentrant portions of the containers and in part to the overheating of glass at these points, due to the concentration of the current incident to its tendency to follow the shortest path through the conductor.

An object of this invention is, therefore, to provide a structure by which this wear is reduced both by providing at the points subject to the greatest wear material resistant to the mechanical wear and by providing a means for redistributing the current and preferably for causing portions thereof to pass through material of electric conductivity preferably greater than glass, so that the amount of the current passing through the glass around the corners, or points subject to the greatest wear, may be reduced and the heat produced at this point reduced, thus reducing local overheating of the glass.

A further and perhaps broader object of the invention is to provide a means in a device of the character described for reducing local overheating of the glass or reducing the temperature thereof locally at any desired point, this being preferably accomplished by providing a member of electric conductivity higher than molten glass at the point at which it is desired to reduce the temperature, so that current may pass through this member rather than the glass about it and thus reduce the heating effect of the current upon the glass at the desired point in question.

Other and more specific objects of the present invention will become apparent from a reading of the following specification and sub-joined claims when taken in connection with the accompanying drawing in which:

Figure 1 is a view substantially in vertical section of a glass melting tank embodying my invention;

Fig. 2 is a view in horizontal section taken on the line 2—2 of Fig. 1;

Fig. 3 is a fragmentary vertical section corresponding to a portion of the showing of Fig. 1 but illustrating another embodiment of my invention;

Fig. 4 is a fragmentary view partially in horizontal section and partially in plan of the form of the invention shown in Fig. 3; and Fig. 5 is a fragmentary view substantially in vertical section and similar to Fig. 3, but showing a still further embodiment of my invention.

Referring to Figs. 1 and 2, I have chosen to illustrate my invention as applied to a glass melting tank substantially similar to that shown in Figs. 5 and 6 of the patent to Hitner 1,827,472, granted Oct. 13, 1931. The tank shown in these figures is constructed of refractory walls and comprises an upper chamber 1 and a lower chamber 2 connected by a constricted neck portion 3, the horizontal cross section of which is less than corresponding sections of chambers 1 and 2. Glass making material or batch may be supplied to the tank through the arch 4 thereof through a chute or conduit 5. Molten glass is withdrawn from the lower portion or chamber 2 of the tank through a submerged throat 6 to a chamber 7, which is somewhat different from the showing of the Hitner patent. As shown, the glass in the chamber 7 may be suitably heated as by a fluid fuel burner 8, which is adapted to project a flame into the chamber 7 through a suitable burner opening 9. Glass may be conducted from the chamber 7 to a suitable forehearth or other structure, generally indicated at 10, under control of a vertically adjustable gate 11. This structure may be of any usual or well-known type, for example, it may take the form illustrated in the patent to Peiler No. 1,760,254, granted May 27, 1930.

Current may be supplied to the glass in the tank from three electrodes 12, 13 and 14, and according to the wiring diagrammatically illustrated, will pass between the electrodes 12 and 13, on the one hand, communicating with the glass in the chamber 1, and electrode 14 on the other hand communicating with the glass in the chamber 2. These electrodes are connected with the secondary transformer coil 15 by means of leads 16, 17, 18 and 19, a current equalizer 20 being employed to regulate the distribution of the current between the electrodes 12 and 13. The primary coil 21 of the transformer, of which coil 15 is the secondary, is supplied with current from main current supply lines 22 and 23. The electrodes 12, 13 and 14 may be of the type disclosed in the Hitner patent aforesaid, namely, of nickel-chromium alloy, which will not discolor the glass under the heat conditions normally present in the tank, such plates being kept cool by direct exposure to the atmosphere on their outer sides. In order to support the bottom electrode 14 which becomes highly heated and would otherwise sag, a series of plates 24 may be employed carried between pairs of channels 25, such channels being supported in turn upon the transverse channels 26. As shown, the channels 26 also support I-beams 27, which in turn support the refractory bottoms for the throat 6 and the chamber 7 of the tank.

Due to the peculiar configuration of the tank and the location of the electrodes 12, 13 and 14 therein, current will be forced to take a curved path in order to pass through the glass between the electrodes. This will cause a concentration of the current lines adjacent to the corners at the junctures of the reduced or constricted portion 3 of the tank and the larger portions 1 and 2 thereof. If the entire wall of the tank were constructed of refractory materials, according to prior art practice, excessive wear would take place at these corners. According to my present invention, however, these corners are recessed, as shown at 28 and 29, and into the recesses so formed are set members 30 and 31, respectively of electric conducting material neutral to glass under the condition of operation such, for example, as graphite, said members being formed as rectangular ring-like structures and built into the tank walls, any desired interconnections being used where necessary to anchor the graphite members in the tank walls. The use of graphite is particularly advantageous in that once it is submerged beneath the surface of the glass, it cannot come in contact with the oxygen of the air and thus is practically free from wear or corrosion except that due to the mechanical action of the glass in moving around these corners, which is almost negligible.

Another advantage of the use of graphite is that it has a very low coefficient of expansion and thus is permanent in so far as temperature changes are concerned. In the present case, however, I make use of the property of graphite as an electric conductor for use in contact with glass when no current is directly passed to the graphite members from outside sources. By inserting the graphite members 30 and 31 in the position shown, and due to the property of graphite to conduct electricity, a portion of the current passing between the electrodes 12 and 13, on the one hand, and 14, on the other, will pass through the graphite members 30 and 31 as indicated by the dotted lines in Fig. 1, which are the lines of current flow. This will effect a redistribution of the current flow, with a result that the glass adjacent to the corners will be required to conduct a lesser amount of current than would be the case in an ordinary tank, such as that of the Hitner patent, in which graphite members of the present invention are not used. This reduces the heating of the glass adjacent to these corners, which in turn greatly lengthens the life of the corners, and thus of the tank as a whole.

In Figs. 3 and 4, I have shown another embodiment of my invention. Inset in recesses in the refractory tank walls, graphite members projecting out into the glass are used which tend further to constrict the path of the glass and thus to keep away from the refractory corners of the tank walls at least that portion of the glass which has a material flowing movement.

Referring to Fig. 4, the constricted portion of the tank (corresponding to the portion 3, Fig. 1) may be considered as that portion bounded by lines 32, 33 and 34. Graphite bar members 35 and 36 are first laid across the sides of the opening into the constricted portion and have their ends reduced in thickness to pass through recesses 37 in cross members 38, the ends of which are received in suitable recesses in the tank walls, as indicated at 39. In this way it will be seen that the members 35, 36 and 38 serve to constrict the flow between the glass in the chamber 1 and the glass in the chamber 3 and thus to keep the rapidly flowing glass away from the refractory walls and corners of the chamber 3, with a result of longer life for these walls and corners. Also the use of graphite members 35, 36 and 38 in this position will serve to redistribute the current as aforesaid.

I have shown a still further modification of my invention in Fig. 5, wherein a graphite member 39 is used in substantially the same space relation to the walls of the tank as that indicated in Fig. 3. The member 39 is, however, provided with an outwardly extending integral portion 40 which may be built into a recess in the corners of the tank, as clearly illustrated in the drawing. The results of the use of this structure are the same as that described for Figs. 3 and 4.

When the term "glass" is used in the present description and appended claims, it is to be understood and construed not in any restrictive sense, but rather as covering all analogous materials as water glass, enamels, etc., which may be melted or kept in a heated condition in a tank or similar container by the passage of electric current through the bath between spaced electrodes.

While I have shown my invention as applied to a tank for melting glass, it will be understood that it is equally applicable to tanks or glass containers wherein it is desired merely to maintain a body of molten glass or other analogous material, as water glass, enamels, cements, etc., in a desired fluid condition by the passage of an electric current therethrough. Also my invention is applicable to the reduction of temperature at a predetermined desired point in a bath of molten glass or other analogous material heated by electricity, in that the temperature may be locally reduced at any desired portion of such a bath by the interposition at or adjacent to such portion of a member of electric conducting material, such material preferably, but not necessarily, being graphite. Also members of platinum may be used in certain installations where the initial cost is not prohibitive and also suitable metal alloys in cases where the temperatures and nature of the material permits. In some instances it may also be desirable to use a member of coated graphite as disclosed in the copending application of Henry, Serial No. 480,881, filed Sept. 10, 1930 wherein a graphite electrode is disclosed as coated with a layer of material of a ceramic nature which prevents oxidation of the graphite while permitting the passage of electric current between it and the bath. Obviously many modifications may be made in practice without departing from the spirit of my invention, and I do not wish to be limited, therefore, except by the scope of the appended claims, which are to be construed as broadly as the state of the prior art permits.

I claim:

1. Glass making apparatus, comprising a container for a bath of molten glass, spaced electrodes associated with said container adapted for passing a current of electricity through said bath for controlling its temperature, and a member of electric conducting material positioned in contact with the glass in said container during the continuous operation thereof and adjacent to the path of current flow therethrough for redistributing the flow of electric current through the glass adjacent to said member.

2. Glass making apparatus, comprising a container for a bath of molten glass, spaced electrodes associated with said container adapted for passing a current of electricity through said bath for controlling its temperature, a graphite member permanently located wholly beneath the surface of said bath of glass and in contact therewith in a position adjacent to the path of flow of the electric current therethrough for affecting a continuous redistribution of current flow such that a material portion of the current passes through said member and a decreased current passes through the glass adjacent thereto.

3. Means for locally reducing the temperature of a body of molten glass in a container in which the glass is used as a conductor for a current of electricity between spaced electrodes, comprising a member of higher electric conductivity than the glass located in contact with the glass adjacent to the point at which it is desired that the temperature be reduced.

4. Glass making apparatus, comprising a container for a bath of molten glass, the container being so shaped that at least one glass contacting wall has a reentrant portion, electrodes associated with said container for passing a current of electricity through said bath of glass to control the temperature thereof, the current passing around said reentrant portion, and means for reducing the tendency of the glass to overheat and for reducing the wear of the wall of said container comprising a piece of electric conducting material permanently associated with the wall of said container at said reentrant portion and in contact with said bath of glass.

5. Glass making apparatus, comprising a container for a bath of molten glass, the container being so shaped that the bath has a constricted portion separating two larger portions, electrodes associated with the larger portions of said container for passing a current of electricity through said bath of glass to control the temperature thereon in a path extending from one larger portion to the other through said constricted portion, a member of electric conducting material permanently associated with the walls of said container adjacent to said constricted portion for controlling the distribution of current in adjacent portions of the bath and for thereby reducing the tendency of the glass to overheat adjacent to said constricted portion and reducing the wear of the walls of the container at this portion.

6. Glass making apparatus, comprising a container for a bath of molten glass, the container being so shaped as to include a relatively larger portion and a contiguous relatively smaller portion, electrodes associated with said container for passing a current of electricity through said bath of glass to control the temperature thereof and in a path passing between said larger portion and said smaller portion, and a graphite member mounted in said container beneath the surface of said glass at the line of division between said larger portion and said smaller portion for redistributing the current flow at that point and thereby for reducing the tendency of the glass to overheat at the juncture of the larger and smaller portions and reducing the wear on the tank walls at that point.

7. Glass making apparatus, comprising a container for a bath of molten glass, the container being so shaped that the glass bath therein will have a constricted portion connecting larger portions of the bath, electrodes associated with said container for passing a current of electricity through said bath of glass to control the temperature thereof and in a path passing from one of said larger portions through said constricted portion to the other of said larger portions, and graphite corner members associated with the walls of said container and totally submerged in the glass at the corners protruding into the bath between said constricted portion and each of said larger portions, whereby to reduce overheating of the glass adjacent to these points in the container.

8. Glass making apparatus, comprising a container for a bath of molten glass, the container being so shaped that at least one glass contacting wall has a reentrant portion forming a corner projecting into the bath of glass within the container, electrodes associated with said container for passing a current of electricity through the bath of glass therein for controlling the temperature of said bath, the electrodes being so positioned in respect to said container that the path of the current through the glass passes around said corner, and a totally submerged graphite block set in a recess at said corner and having glass contacting surfaces formed as prolongations of the walls of said container extending toward said corner, whereby a portion of the current flowing between said electrodes will pass through said graphite block and thereby the heating of the glass adjacent to said corner will be decreased, whereby the corner of said container will have a longer life.

9. Glass making apparatus, comprising a container for a bath of molten glass, the container being so shaped that the bath of glass therein will include a larger portion contiguous to a smaller portion, the container walls having a corner at the juncture of said portions which projects inwardly of the bath, electrodes associated with said container and positioned in respect thereto in such manner that a current of electricity will flow through said bath of glass between the larger portion and the smaller portion around said corner, and at least one graphite member adapted to be totally submerged in the glass and located at said corner and projecting inwardly from the walls of said container into the bath of glass further to constrict the passage between the larger and the smaller portions of the bath, whereby to effect a redistribution of the current flow at the juncture of the larger and smaller portions of the bath.

10. Glass making apparatus, comprising a container for a bath of molten glass having an upper portion of relatively large cross sectional area contiguous with a portion therebeneath of smaller cross sectional area, the last named portion being substantialy rectangular in horizontal cross section, an electrode associated with said upper portion of the container, a second electrode associated with said container to pass electric current through the glass in the lower smaller portion of the container in passing to the first named electrode, means to pass an electric current through the glass in said container and through said electrodes, and means for reducing wear and preventing overheating of the shoulders f said container between the upper larger portion and the lower smaller portion, said last named means comprising graphite bars disposed in parallel relation to each other and having their ends supported upon the container walls adjacent to the communication between the upper larger portion and the lower smaller portion, and other graphite bars recessed to engage and prevent dislodgment of the first named bars and in parallel relation with each other perpendicular to the first named bars and having their ends received in recesses in the walls of said container, both sets of bars being positioned to constrict the passage between the upper larger portion of said container and the lower smaller portion thereof, whereby the bars of graphite serve to redistribute the current flowing between said electrodes through the glass by themselves conducting a portion of the current.

11. Glass making apparatus, comprising a container for a bath of molten glass including an upper larger portion and a lower smaller portion contiguous to said larger portion, electrodes associated with said container for passing electric current through the glass between the upper larger portion and the lower smaller portion thereof, and a graphite ring-like member associated with said container the juncture of the upper larger portion and the lower smaller portion, said graphite member having an aperture therethrough of smaller cross sectional area than said lower smaller portion, whereby further to constrict the passage for glass therethrough, and having integral portions projecting into and received in recesses in the walls of said container adjacent the juncture of said larger and smaller portions thereof, whereby to redistribute the curent passing between said electrodes and reduce the heating of the glass adjacent the juncture of the larger and smaller portions of said container.

12. Apparatus for making glass, comprising a substantially vertical tank having an upper larger portion, an intermediate constricted portion and a lower larger portion, means for feeding glass making material to said upper portion, means for supplying heat to the glass to melt and refine the glass making material and convert it into glass including an electrode communicating with the glass in the upper larger portion of said container and a second electrode communicating with the glass in the lower larger portion thereof, means to supply current to said electrodes, means to withdraw molten glass from said lower portions of the container, and graphite corner members set into recesses in the walls of said container at the junctures of said smaller intermediate portion with said upper and lower larger portions thereof, whereby to reduce the heating effect due to the passage of current through the glass adjacent to the reentrant corner portions of the container and thus prolonging the life of the corners of said container and of the container as a whole.

HAROLD A. WADMAN.